July 25, 1967     J. T. CLEMENT     3,332,412
VISE FOR LAPIDARY SAW

Filed Jan. 8, 1965     2 Sheets-Sheet 1

INVENTOR.
JONCE T. CLEMENT,
BY
Berman, Davidson & Berman
ATTORNEYS.

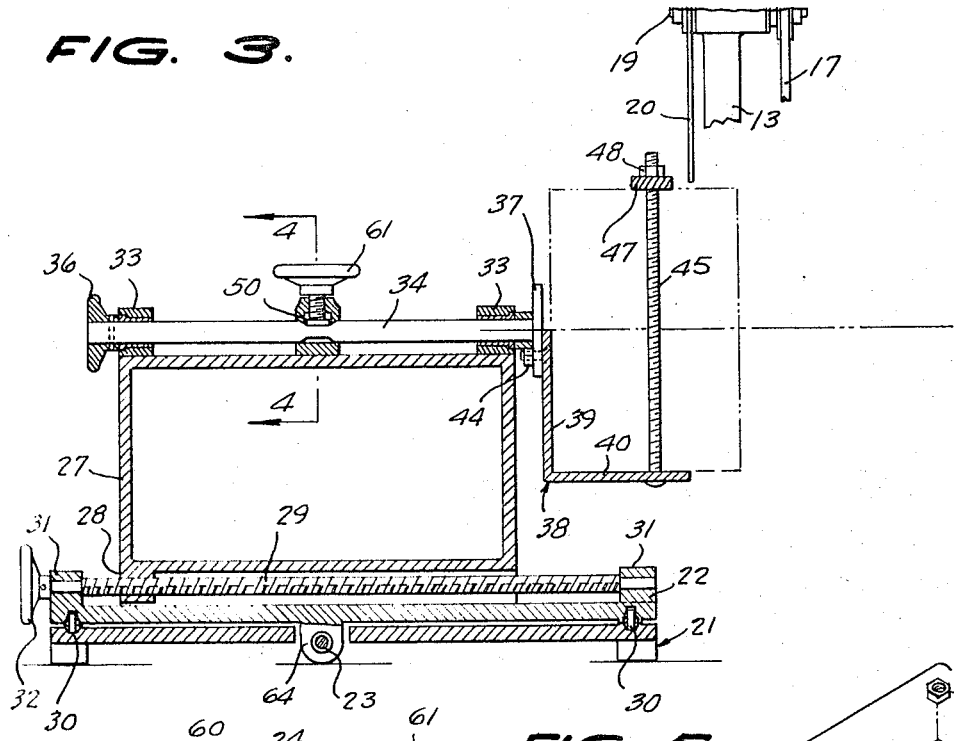
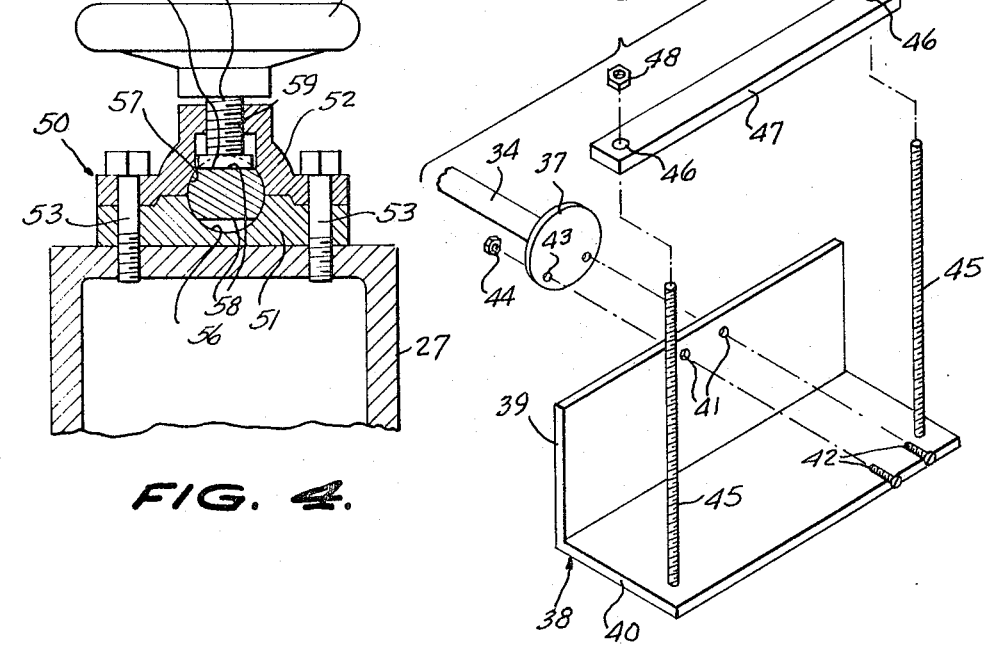

United States Patent Office 3,332,412
Patented July 25, 1967

3,332,412
VISE FOR LAPIDARY SAW
Jonce T. Clement, 5007 Bevvie Drive,
Las Vegas, Nev. 89108
Filed Jan. 8, 1965, Ser. No. 424,398
2 Claims. (Cl. 125—14)

ABSTRACT OF THE DISCLOSURE

A lapidary saw unit consisting of a frame provided with a vertically-swinging arm carrying the power-driven rotary saw blade and a workpiece feed table movably-mounted on the frame beneath the saw blade. The table is provided with a longitudinal feed screw mechanism. A horizontal work holder support shaft is rotatably-mounted on an upstanding box-like support movably-mounted on the table for transverse adjustment. A cross-feed screw mechanism adjusts the box-like support on the table. The support shaft extends transverse to the plane of the saw, and a work-holding angle bar is secured to the end of the shaft under the blade. The angle bar has a pair of upstanding studs spaced to receive a workpiece therebetween, and a clamping bar is engaged on the studs to clamp the workpiece on the angle bar. The shaft has an intermediate portion formed with diametrically-opposed flats. This intermediate portion is received in a bracket on the box-like support and the bracket is provided with a clamping screw lockingly-engageable with the flats to clamp the shaft in either of two diametrically-opposite positions of rotary adjustment.

---

This invention relates to work holders, and more particularly to an improved lapidary saw assembly provided with a work holder which can be rotatably adjusted.

The main object of the invention is to provide a novel and improved lapidary saw assembly including adjustable work-holding means, said assembly being simple in construction, being accurately adjustable so as to present a workpiece for cutting at a desired location thereon, and being arranged so that a workpiece can be rotated to a diametrically opposite position after a first cut so that a second cut can be made in the same cutting plane, thereby enabling a much larger workpiece to be cut than has been possible with the work holder arrangements of the prior art.

A further object of the invention is to provide an improved workholding device for use in a lapidary saw assembly, said device involving inexpensive components, being rugged in construction, being easy to adjust, and providing a means for cutting relatively large stones with a lapidary saw employing a blade of relatively small diameter.

Further objects and advantages of the invention will become apparent from the following description and claims, and from the accompanying drawings, wherein:

FIGURE 3 is a vertical cross sectional view taken substantially on the line 3—3 of FIGURE 2.

FIGURE 4 is an enlarged vertical cross sectional view taken substantially on the line 4—4 of FIGURE 3.

FIGURE 5 is an enlarged perspective view of the components of the work-holding vise portion of the saw assembly of FIGURES 1 to 4, the components being shown in separated positions.

Figure 1:
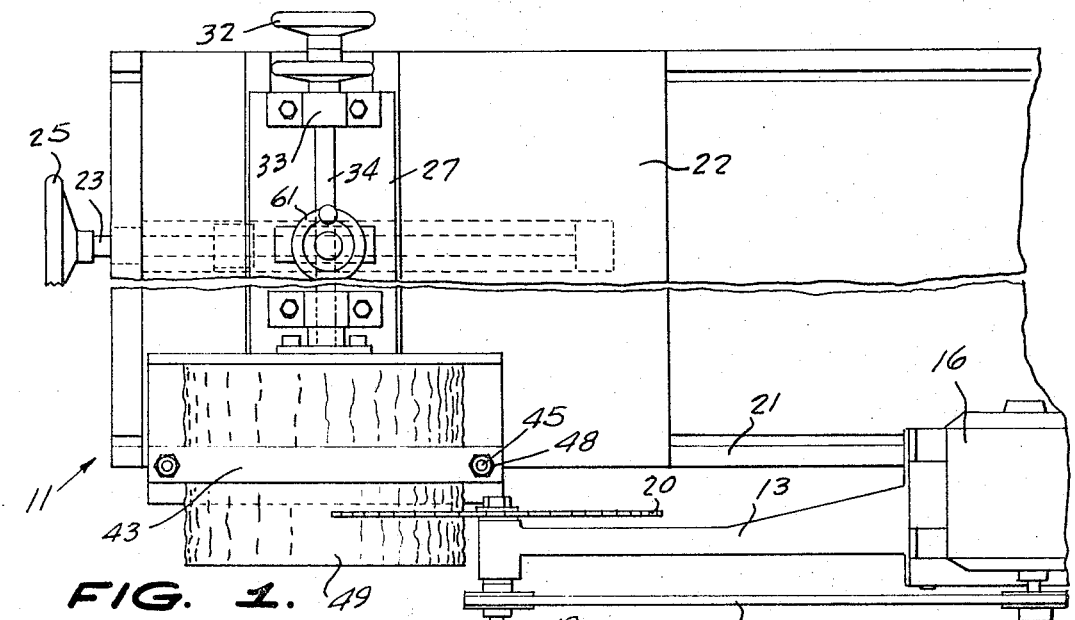
FIGURE 1 is a fragmentary top plan view of an improved lapidary saw assembly constructed in accordance with the present invention.

Referring to the drawings, 11 generally designates an improved lapidary saw assembly constructed in accordance with the present invention, said assembly comprising a saw unit, designated generally at 12, which may be similar to the pivoted saw unit identified by the trade name "Roto-Set II," manufactured by Felkner Manufacturing Co., 1128 Van Ness Avenue, Torrance, California. This saw unit comprises a pivoted member 13, pivoted at 14 to an upstanding rigid support member 15, the pivoted member carrying a drive motor 16 which is connected by a belt 17 to a pulley 18 mounted on a shaft 19 journaled in the free end portion of the pivoted member 13 and having a circular lapidary saw blade 20 secured thereon. The rotating saw blade 20 is thus swingable around an arc having its center at the pivot connection 14, being swingable downwardly from the elevation position thereof shown in full line view in FIGURE 2 towards a subjacent workpiece, as will be presently described.

Designated generally at 21, is a supporting table on whose frame the upstanding saw supporting member 15 is rigidly secured, the supporting table being provided with depending legs or similar support means. A cross feed plate member 22 is movably mounted on the table 21, said cross feed plate member being supported on suitable rollers 30 for movement in a direction perpendicular to the vertical plane of shaft 19, the plate member 22 being provided with depending lugs 24 which threadedly receive a cross feed operating screw 23 suitably journaled in the table member 21 and provided with an operating wheel 25. Movably mounted on the table member 22 is an upstanding box-like frame member 27 which has depending lugs 28 threadedly engaged by a longitudinally extending feed screw 29 journaled in upstanding bearing lugs 31, 31 provided at opposite ends of the plate member 22, the screw 29 having an operating wheel 32 secured to one end thereof. As is clearly apparent from FIGURE 3, rotation of wheel 32 moves the box-like upstanding frame 27 longitudinally, namely, in a direction parallel to the shaft 19, whereas rotation of the operating wheel 25 moves the plate member 22 in a transverse direction relative to shaft 19.

The top wall of the frame member 27 is provided at its opposite ends with upstanding bearing brackets 33, 33, and rotatably mounted therein is a work-holder shaft 34 provided at the end thereof remote from the region subjacent the saw blade 20 with an adjusting wheel 36. At its other end the shaft 34 is provided with a connection flange 37 to which is secured an angle bracket 38. As shown in FIGURE 5, the angle bracket 38 has the respective flanges 39 and 40, the flange 39 being provided at the intermediate portion of one margin thereof with apertures 41 through which fastening screws 42 are engageable, being received through fastening apertures 43 provided in the flange 37 and having clamping nuts 44 threaded thereon to secure the angle bracket 38 to said flange 37. The flange 40 of bracket 38 is provided at its opposite corners with upstanding studs 45, 45 engageable through apertures 46, 46 in a clamping bar 47, respective nuts 48, 48 being provided on the top ends of the studs 45, 45 to secure the bar 47 in clamping engagement with a workpiece 49 disposed on flange 40 between the studs 45, 45 in the manner illustrated in FIGURES 1 and 2.

With the workpiece 49 thus clamped on the angle bracket 38, said workpiece may be supported subjacent the normal position of the rotary saw blade 20, so that when the arm 13 is swung downwardly, the saw blade will engage the workpiece and make a cut therethrough.

The shaft 34 extends through an intermediate bearing bracket assembly 50 provided on the top wall of the box-like frame member 27, said bearing assembly comprising a bottom bearing block 51 and an upper bearing block 52, the upper bearing block 52 being fastened to the top wall of the member 27 by respective fastening bolts 53, 53 extending through the opposite end portions of the block members 51 and 52 and threadedly engaged in the top wall of the frame member 27, as is clearly shown in FIGURE 4. The members 51 and 52 are formed with arcuate bearing surfaces 56 and 57 receiving the shaft 34, said shaft being provided with diametrically opposite flattened surface portions 58, 58 at the region of the assembly 50. A vertical clamping screw 59 is threaded through the top block 52, said clamping screw being provided with a clamping foot 60 which is engageable with either of the flattened surfaces 58, 58 to lock the shaft 34 in either of two diametrically opposite adjusted positions. The screw 59 is provided with a hand wheel 61 for rotating same.

Figure 2:
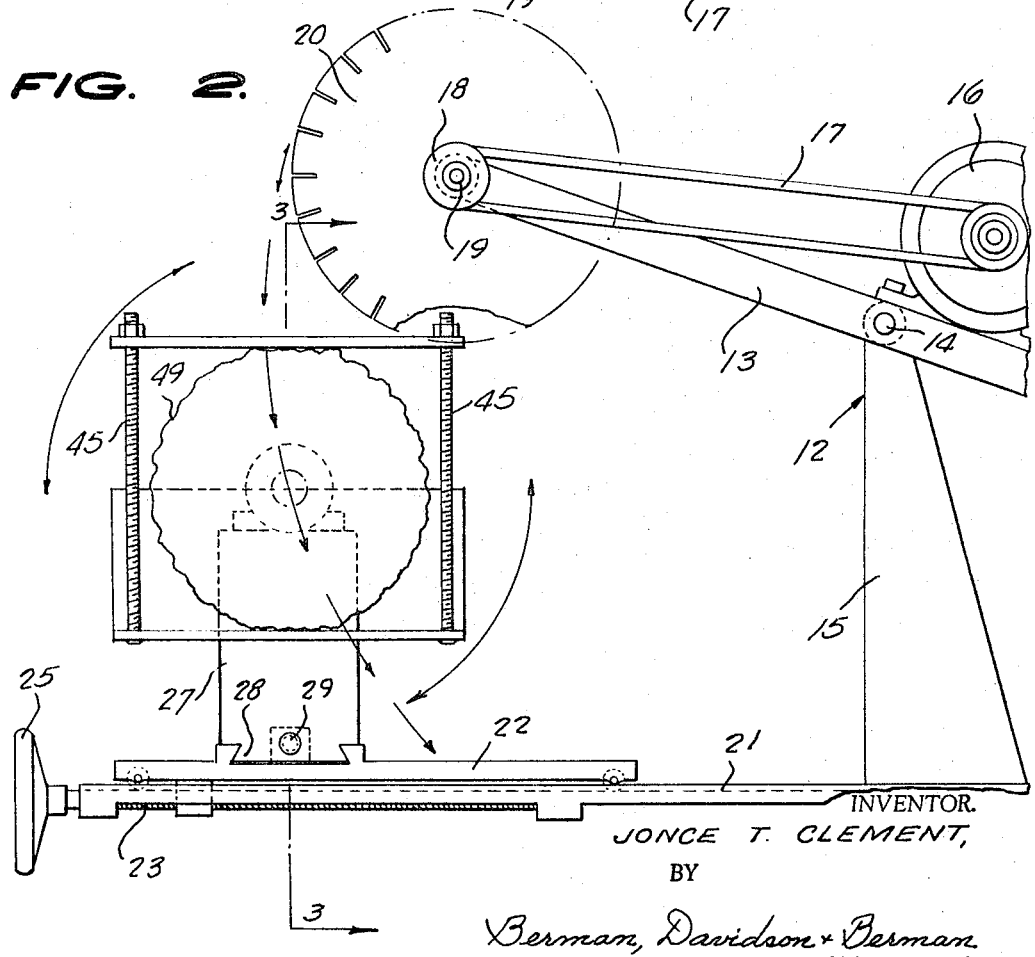
FIGURE 2 is a front elevational view of the lapidary saw assembly illustrated in FIGURE 1.

In operation, a stone to be cut, for example, the workpiece 49 illustrated in the drawings, is clamped between the flange 40 of angle bracket 38 and the clamping bar 47 to hold the workpiece rigidly secured to the end of shaft 34, and the shaft 34 is then locked in one of its two working positions by means of the screw 59, namely, by engaging the foot 60 with one of the flattened surface portions 58. The workpiece 49 is then adjusted to a position subjacent the blade 20 corresponding to the location of the desired cut through the workpiece. As shown in FIGURE 2, the workpiece 49 may be of relatively large diameter, namely, of a diameter such that the maximum depth cut available from the operation of the circular saw blade 20 is approximately sufficient to cut halfway through the workpiece. Thus, an initial cut may be made to this maximum depth, after which the shaft 34 may be released by loosening the screw 59 and then rotated through one-half of a revolution, after which the screw 59 is retightened to again lock the shaft in a fixed position with the workpiece 49 correspondingly rotated through one-half of a revolution. Therefore the next downward cut made by the rotary saw blade 20 will be sufficient to substantially complete the cutting of the workpiece, since it will pass through the remaining portion of the workpiece in the same plane as the original cut.

From the above it will be apparent that relatively large-diameter stones may be cut using a saw blade 20 of normal diameter, namely, by a saw blade having a radius only larger by a small amount than one-half the maximum diameter of the workpiece to be cut.

It will be further apparent that after the workpiece has been clamped between the flange 40 of angle bracket 38 and the clamping bar 47, it can be accurately adjusted under the saw blade 20 to a desired cutting position by properly positioning the upstanding frame member 27, employing the longitudinal feed screw 29 and the transverse feed screw 23 in the manner above described. The frame member 27 is smoothly adjustable since the dovetailed lugs 28 slidably engage in correspondingly shaped grooves provided therefor in the plate member 22.

While a specific embodiment of an improved lapidary saw assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a lapidary saw assembly, a saw unit comprising a pivoted member having a vertical rotary saw on the free end portion thereof, and a work holder comprising a suport subjacent said pivoted member, a shaft rotatably mounted on the support perpendicular to the plane of the saw, a work-clamping angle bracket secured on the end of said shaft located substantially in the path of swinging movement of the saw, said angle bracket being provided with a pair of spaced upstanding studs adapted to receive a workpiece therebetween and a clamping bar engageable on said studs for clampingly-securing the workpiece on the angle bracket, a bracket member on the support rotatably receiving said shaft, said shaft having opposing flattened surfaces on the portion thereof received in the bracket member, and a clamping screw on the bracket member lockingly engageable with said flattened surfaces to lock the shaft in either of two diametrically opposite adjusted positions thereof.

2. In a lapidary saw assembly, a saw unit comprising a pivoted member having a vertical rotary saw on the free end portion thereof, and a work holder comprising a table member subjacent said pivoted member, a support movably mounted on the table member, longitudinal feed means connecting the support to the table member for adjusting the support longitudinally, cross feed means connecting the support to the table member for adjusting the support transversely, a shaft rotatably mounted on the support perpendicular to the plane of the saw, a work-clamping angle bracket secured on the end of said shaft located substantially in the path of swinging movement of the saw, said angle bracket being provided with a pair of spaced upstanding studs adapted to receive a workpiece therebetween and a clamping bar engageable on said studs for clampingly-securing the workpiece on the angle bracket, a bracket member on the support rotatably receiving said shaft, said shaft having opposing flattened surfaces on the portion thereof received in the bracket member, and a clamping screw on the bracket member lockingly engageable with said flattened surfaces to lock the shaft in either of two diametrically opposite adjusted positions thereof.

References Cited

UNITED STATES PATENTS

| | | | |
|---|---|---|---|
| 1,880,979 | 10/1932 | Parker | 264—76 X |
| 2,323,057 | 6/1943 | Lammerding | 269—65 |
| 2,330,510 | 9/1943 | Moffat | 125—13 |
| 2,413,795 | 1/1947 | Speed | 125—14 |
| 3,103,922 | 9/1963 | Nelson | 125—13 |
| 3,168,893 | 2/1965 | Johnson | 125—13 |

FOREIGN PATENTS

| | | |
|---|---|---|
| 673,286 | 6/1952 | Great Britain. |

HAROLD D. WHITEHEAD, *Primary Examiner.*